(12) United States Patent
Bourd et al.

(10) Patent No.: US 8,269,775 B2
(45) Date of Patent: Sep. 18, 2012

(54) DISCARDING OF VERTEX POINTS DURING TWO-DIMENSIONAL GRAPHICS RENDERING USING THREE-DIMENSIONAL GRAPHICS HARDWARE

(75) Inventors: Alexei V. Bourd, San Diego, CA (US); Guofang Jiao, San Diego, CA (US); Jay C. Yun, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 740 days.

(21) Appl. No.: 12/331,273

(22) Filed: Dec. 9, 2008

(65) Prior Publication Data

US 2010/0141659 A1 Jun. 10, 2010

(51) Int. Cl.
*G06T 11/20* (2006.01)
(52) U.S. Cl. .................................................. 345/442
(58) Field of Classification Search .................. 345/442, 345/443
See application file for complete search history.

(56) References Cited

U.S. PATENT DOCUMENTS

| | | | |
|---|---|---|---|
| 5,321,770 A | 6/1994 | Huttenlocher et al. | |
| 5,613,052 A | 3/1997 | Narayanaswami | |
| 5,668,894 A * | 9/1997 | Hamano et al. | 382/242 |
| 5,933,149 A * | 8/1999 | Mori et al. | 345/442 |
| 6,219,070 B1 | 4/2001 | Baker et al. | |
| 6,292,194 B1 | 9/2001 | Powell, III | |
| 6,404,936 B1 | 6/2002 | Katayama et al. | |
| 6,483,509 B1 * | 11/2002 | Rabenhorst | 345/442 |
| 6,489,966 B1 | 12/2002 | Kanzaki et al. | |
| 6,633,297 B2 | 10/2003 | McCormack et al. | |
| 6,731,300 B2 | 5/2004 | Tang et al. | |
| 6,765,576 B2 | 7/2004 | Nelson | |
| 6,768,491 B2 | 7/2004 | LeFebvre et al. | |
| 6,819,332 B2 | 11/2004 | Baldwin | |
| 7,006,110 B2 | 2/2006 | Crisu et al. | |

(Continued)

FOREIGN PATENT DOCUMENTS

JP 8212355 A 8/1996

(Continued)

OTHER PUBLICATIONS

Dan Sunday: "Polyline Simplification" Feb. 18, 2007, XP002597492 Retrieved from the Internet: URL:http://web.archi ve.org/web/20070218141 209/http://softsurfer.com/Archi ve/algori th m_0205/algori thm_0205.htm [retrieved on Aug. 19, 2010].

(Continued)

*Primary Examiner* — Ryan R Yang
(74) *Attorney, Agent, or Firm* — Matthew J. Evans; James R. Gambale, Jr.

(57) ABSTRACT

This disclosure describes techniques for removing vertex points during two-dimensional (2D) graphics rendering using three-dimensional (3D) graphics hardware. In accordance with the described techniques one or more vertex points may be removed during 2D graphics rendering using 3D graphics hardware. For example, the techniques may remove redundant vertex points in the display coordinate space by discarding vertex points that have the substantially same positional coordinates in the display coordinate space as a previous vertex point. Alternatively or additionally, the techniques may remove excess vertex points that lie in a straight line. Removing the redundant vertex points or vertex points that lie in a straight line allow for more efficient utilization of the hardware resources of the GPU and increase the speed at which the GPU renders the image for display.

48 Claims, 4 Drawing Sheets

U.S. PATENT DOCUMENTS

| | | | |
|---|---|---|---|
| 7,280,119 | B2 | 10/2007 | Leather et al. |
| 7,456,846 | B1 | 11/2008 | King et al. |
| 7,652,677 | B2 | 1/2010 | Dorbie et al. |
| 2006/0146050 | A1* | 7/2006 | Yamauchi .................... 345/423 |
| 2007/0038421 | A1 | 2/2007 | Hu et al. |
| 2008/0122866 | A1 | 5/2008 | Dorbie et al. |

FOREIGN PATENT DOCUMENTS

| | | |
|---|---|---|
| JP | 10275241 A | 10/1998 |
| JP | 2001005989 A | 1/2001 |
| JP | 2003509780 | 3/2003 |
| JP | 2006209223 A | 8/2006 |
| WO | WO 01020553 | 3/2001 |

OTHER PUBLICATIONS

Douglas D H et al: "Algorithms for the Reduction of the Number of Points Required to Represent a Digitized Line or Its Caricature" Canadian Cartographer, York University, Downsview, CA, vol. 10, No. 2, Jan. 1, 1973, pp. 112-122, XP009005710.

International Search Report and Written Opinion—PCT/US2009/067000, International Search Authority—European Pattent Office—Sep. 1, 2010.

Richard Thomson: "Chapter 19 D3DX Mesh Objects" The DirectSD Graphics Pipeline Jan. 11, 2007, XP002597493 Retrieved from the Internet: URL:http://web.archi ve.org/web/20070111230 258/http://www.xmi s s i on.com/l1egalize/book /download/ 19-.

Ackermann, "Single Chip Hardware Support for Rasterization and Texture Mapping," Computers and Graphics, Jul. 1996, pp. 503-514, vol. 20, No. 4, Elsevier, GB, XP004025144.

Amendment for U.S. Appl. No. 11/499,200, filed Sep. 7, 2010, 3 pp.

Capens, "Advanced Rasterization," Devmaster.Net Forum Post, Nov. 9, 2004, Internet Reference, XP002503146.

Greene, "Hierarchical Polygon Tiling with Coverage Masks," Association for Computing Machinery, Computer Graphics Proceedings 1996 (Siggraph), New Orleans, Aug. 4, 1996, pp. 65-74, Siggraph, New York, NY, USA, XP000682722.

Notice of Allowance for U.S. Appl. No. 11/499,200, mailed Sep. 18, 2009, 4 pp.

Office Action from U.S. Appl. No. 11/499,200, dated Feb. 17, 2009, 11 pp.

Response to Office Action dated Feb. 17, 2009, from U.S. Appl. No. 11/499,200, filed Jun. 17, 2009, 11 pp.

Rueda et al., "Rasterizing complex polygons without tessellations," Graphical Models, May 1, 2004, pp. 127-132, vol. 66, No. 3, Elsevier, San Diego, CA, USA, XP001244485.

* cited by examiner

DISCARDING OF VERTEX POINTS DURING TWO-DIMENSIONAL GRAPHICS RENDERING USING THREE-DIMENSIONAL GRAPHICS HARDWARE

TECHNICAL FIELD

This disclosure relates to computing devices and, in particular, to graphics rendering by computing devices.

BACKGROUND

Computing devices often require rendering of two-dimensional (2D) curves to a display. Computing devices may require rending of 2D curves for rendering of documents, e.g., to a Portable Document Format (PDF). Computing devices may also require rendering of 2D curves for resolution-independent representation of various geometric shapes, e.g., circles, ellipses, rectangles with rounded corners, and the like. Such shapes are popular in user interface menus and websites. The rendering of 2D shapes via parametric curves may be used in web animation formats such as Adobe Flash and Microsoft Silverlight.

Due to an increasing demand for graphics in three-dimensional (3D) graphics, such as for video games, character animations, and the like, computing devices often include dedicated 3D graphics hardware. Conventional 3D graphics hardware, however, does not provide direct support for rendering 2D curves. As such, computing devices may include separate graphics hardware for rendering 2D and 3D curves. Having to maintain separate graphics hardware is costly in both silicon area and power consumption. In the context of mobile computing devices, such as personal digital assistants (PDAs), wireless communication devices, global positioning devices and the like, the increase area or power consumption is undesirable as it results in larger sized devices, reduced battery times and the like.

SUMMARY

This disclosure describes techniques for rendering 2D curves using 3D graphics hardware. In accordance with the described techniques a computing device may remove one or more vertex points during 2D graphics rendering using 3D graphics hardware. As one example, a graphics processing unit (GPU), which is graphics hardware dedicated to perform graphics rendering operations to display computerized graphics on a display, may remove repetitive (or redundant) vertex points. Repetitive or redundant vertex points are vertex points that have substantially the same positional coordinates in the display coordinate space. For example, two vertex points may be considered repetitive or redundant vertex points if the two vertex points are within ⅛ of a pixel from each other, i.e., their coordinates differ by less than 0.125. To remove redundant vertex points from the graphics pipelines, the GPU may compare each the positional coordinates of each vertex point with positional coordinates of a previous vertex point and discard vertex points that have substantially the same positional coordinates in the display coordinate space as the previous vertex point.

Alternatively or additionally, the GPU may selectively remove one or more vertex points that lie in a straight line. Such a situation may occur, for example, when the portion of the curve represented by three or more vertex points has little or no curvature. In such a case, the straight portion of the curve may be represented equally well using a straight line from the first vertex point, e.g., endpoint, to the last vertex point, endpoint, instead of a series of straight line segments from the first vertex point to the last vertex point. To remove the one or more vertex points between the first vertex point and the last vertex point of the portion of the curve with little or no curvature, the GPU may compare a slope of the series of line segments. The GPU may remove one or more intermediate vertex points between the first and last vertex point of the portion of the curve with little or no curvature when the slopes are substantially the same, e.g., within a tolerable threshold. Removing the redundant vertex points or vertex points that lie in a straight line may allow for more efficient utilization of the hardware resources of the GPU designed for 3D, or other higher dimensions, and increase the speed at which the GPU renders the image for display.

In one aspect, a method comprises determining positional coordinates for each of a plurality of vertex points that lie on a curve to be rendered, analyzing the positional coordinates of at least a portion of the plurality of vertex points and discarding at least one of the plurality of vertex points based on the analysis.

In another aspect, a device comprises a processing unit that determines positional coordinates for each of a plurality of vertex points that lie on a curve to be rendered, analyzes the positional coordinates of at least a portion of the plurality of vertex points, and discards at least one of the plurality of vertex points based on the analysis.

In another aspect, a device comprises means for determining positional coordinates for each of a plurality of vertex points that lie on a curve to be rendered, means for analyzing the positional coordinates of at least a portion of the plurality of vertex points, and means for discarding at least one of the plurality of vertex points based on the analysis.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor. Accordingly, this disclosure also contemplates computer-readable media comprising instructions to cause a processor to perform any of a variety of techniques as described in this disclosure.

For example, in some aspects, the disclosure provides a computer-readable medium comprises instructions that, when executed, cause at least one processor to determine positional coordinates for each of a plurality of vertex points that lie on a curve to be rendered, analyze the positional coordinates of at least a portion of the plurality of vertex points and discard at least one of the plurality of vertex points based on the analysis.

The details of one or more aspects of the techniques described in this disclosure are set forth in the accompanying drawings and the description below. Other features, objects, and advantages of the techniques will be apparent from the description and drawings, and from the claims.

DETAILED DESCRIPTION

Figure 1:
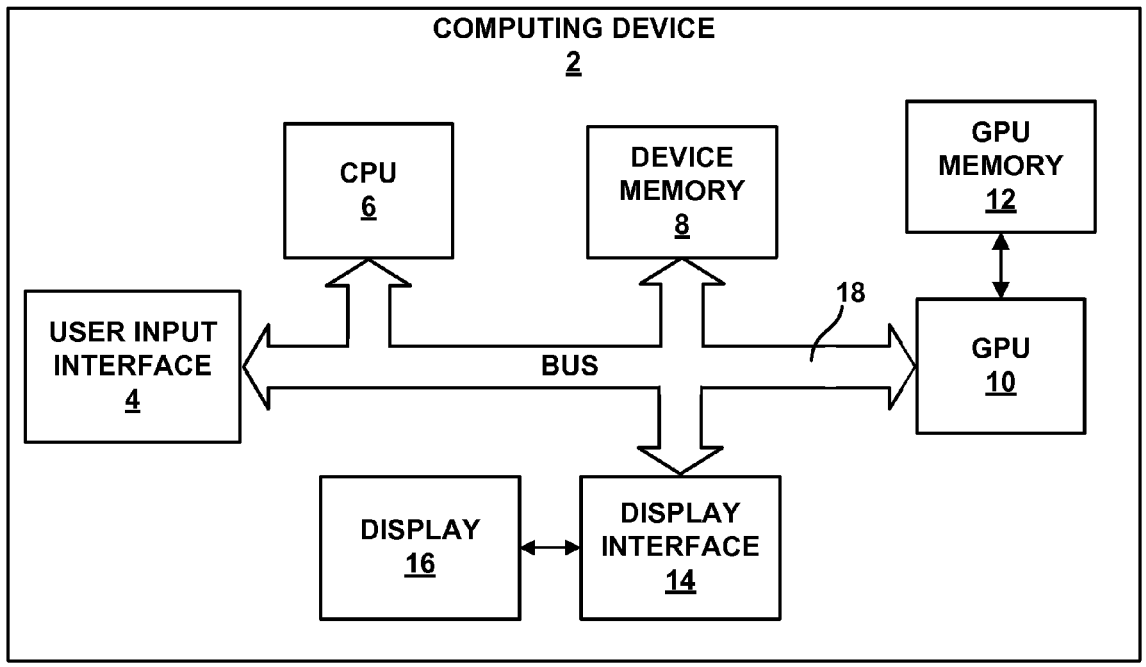
FIG. 1 is a block diagram illustrating an example computing device that performs tessellation in accordance with the techniques described in this disclosure.

FIG. 1 is a block diagram illustrating an example computing device 2 that performs tessellation in accordance with the techniques described in this disclosure. Computing device 2 may comprise any wired or wireless device that outputs graphical information. For example, computing device 2 may comprise a personal computer, a desktop computer, a laptop computer, a computer workstation, a video game platform or console, a cellular or satellite telephone, an Internet telephone, a handheld device such as a portable video game device or a personal digital assistant (PDA), a personal music player, a video player, a television or another type of device that outputs graphical information.

As illustrated in the example of FIG. 1, computing device 2 includes a user input interface 4, a CPU 6, a device memory 8, a GPU 10, a GPU memory 12, a display interface 14 and a display 16. User input interface 4, CPU 6, device memory 8, GPU 10 and display interface 14 may communicate using a bus 18. Bus 18 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect.

CPU 6 may comprise a general-purpose or a special-purpose processor that controls operation of computing device 2. A user may provide input to computing device 2 to cause CPU 6 to execute one or more software applications. The software applications that execute on CPU 6 may include a word processor application, a spread sheet application, a media player application, a video game application, a graphical user interface application or another end-user program. The user may provide input to computing device 2 via one or more input devices (not shown) such as a keyboard, a mouse, a microphone, a touch pad or another input device that is coupled to computing device 2 via user input interface 4.

Device memory 8 may store device configuration information that may be used at start-up or reset to configure computing device 2. Device memory may also store data and/or program modules that are immediately accessible and/or presently being operated on by CPU 6. Device memory 8 may additionally store information from other components of computing device 2, such as information output by GPU 10. Device memory 8 may be one or more volatile or non-volatile memory or storage device, such as random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 10 may be dedicated to performing graphics operations to render computerized graphics on display 16. Thus, when one of the software applications executing on CPU 6 requires graphics processing, CPU 6 provides the graphics information to GPU 10 for rendering to display 16. GPU 10 may, in some instances, be built with a parallel structure that provides more efficient processing of complex graphic-related operations than CPU 6. For example, GPU 10 may include a plurality of graphics pipelines that operate on multiple vertex points in a fully parallel manner. The highly parallel nature of GPU 10 may, in some instances, allow GPU 10 to create complex, 2D or 3D images on display 16 more quickly than drawing the images directly to display 16 with CPU 6. In some instances, GPU 10 may be designed to render 3D graphics to display 16. GPU 10 may, however, be used to perform hardware accelerated rendering of 2D curves. The techniques of this disclosure may be used to improve the efficiency of rendering 2D curves using the 3D graphics hardware, e.g., GPU 10.

In some instances, GPU 10 may be integrated into a motherboard (not shown) of computing device 2. In other instances, GPU 10 may be present on a graphics card that is installed in a port in the motherboard of computing device 2 or may be otherwise incorporated within a peripheral device configured to interoperate with computing device 2. GPU 10 may be one or more processors, such as one or more microprocessors, application specific integrated circuits (ASICs), field programmable gate arrays (FPGAs), digital signal processors (DSPs), or other equivalent integrated or discrete logic circuitry.

GPU 10 may be directly coupled to GPU memory 12. Thus, GPU 10 may read data from and write data to GPU memory 12 without using bus 18. In other words, GPU 10 may process data locally using a local storage, instead of off chip memory. This allows GPU 10 to operate in a more efficient manner by eliminating the need of GPU 10 to read and write data via bus 18, which may experience heavy bus traffic. In some instances, however, GPU 10 may not include a separate memory, but instead utilize device memory 8 via bus 18. GPU memory 12 may be one or more volatile or non-volatile memory or storage device, such as RAM, SRAM, DRAM, EPROM, EEPROM, Flash memory, a magnetic data media or an optical storage media.

CPU 6 and/or GPU 10 may provide image information to display interface 14 for presentation via display 16. In the case of complex 2D and 3D graphics, the image information is typically generated by GPU 10 for display 16. Display 16 may comprise a monitor, a television, a projection device, a liquid crystal display (LCD), a plasma display panel, a light emitting diode (LED) array, a cathode ray tube display, electronic paper, a surface-conduction electron-emitted display (SED), a laser television display, a nanocrystal display or another type of display unit. Display 16 may be integrated within computing device 2. For instance, display 16 may be a screen of a mobile telephone or other wireless communication device. Alternatively, display 16 may be a stand-alone device coupled to computer device 2 via a wired or wireless communications link. For instance, display 16 may be a computer monitor or flat panel display connected to a personal computer via a cable or wireless link.

When one of the software applications executing on CPU 6 desires to present a complex 2D graphics image, CPU 6 and GPU 10 may operate together to render the graphics to display 16. In the case of a word processing application, for example, the software application may desire to render parametric curves to a document, e.g., a PDF document. As another example, the software application may be a software application for presenting a user interface on display 16 using various geometric shapes, e.g., in accordance with the Scalable Vector Graphics (SVG) standard. In a further example, the software application may desire to render 2D shapes via parametric curves for web animation formats such as Adobe Flash and Microsoft Silverlight. The software application includes commands that define one or more 2D curves that form the graphics image to be displayed. In the case of a PDF document, for example, the application may include commands that define curves of a graphical image of various letters and or numbers. In the case of a user interface, the application may include commands that define curves of a graphical image of circles, ellipses, rectangles with rounded corners or the like. The commands may, for example, define a number of curves that define boundaries of the graphical image. In other words, the curves defined by the commands may approximate the curvature of the letters, numbers or shapes.

In one example, the software application may include commands that define a plurality of paths, i.e., curves, in accordance with OpenVG, as defined in a document "OpenVG Specification, Version 1.0," Jul. 28, 2005. OpenVG defines a set of commands that allow for the specification of graphical images in 2D using one or more segment commands. In accordance with the OpenVG Specification, the segment commands may define straight line segments, Bezier curve segments or elliptical arc segments. Extensions of OpenVG may specify other types of segments. Therefore, the techniques of this disclosure are not limited to the segment commands currently defined in the OpenVG specification. Moreover, although the techniques of this disclosure are described in the context of OpenVG, the techniques may be used in the context of other 2D graphics authoring standards, such as SVG, Adobe Illustrator, CorelDRAW, Adobe Flash, Microsoft Silverlight or any other graphics operating standard that used 2D graphics.

To render a 2D curve to display 16 using GPU 10, which as described above may be designed for rendering 3D images, CPU 6 may provide GPU 10 with one or more vertex points associated with the curve. In particular, CPU 6 may compute one or more vertex points that represent control points of the curve. Each of the vertex points may be represented by a number of vertex attributes, which may include a positional coordinate (e.g., (x, y) coordinate for a 2D curve) that represents a location of the vertex point on the curve in the object space. CPU 6 may, for example, generate the one or more vertex points using a mathematical representation corresponding to the particular command segment, which may be specified in the graphics authoring specification (e.g., OpenVG). In addition to the control points, CPU 6 may indicate to GPU 10 the type of curve to be rendered, e.g., straight line segments, Bezier curve segments or elliptical arc segments in the case of OpenVG, and, in some cases, an index number.

CPU 6 may generate a list of drawing primitives using the generated vertex points as at least a portion of the vertex points for the primitives. CPU 6 may generate any of a number of drawing primitives including points, line strips, line loops, separate lines, triangle strips, triangle fans, separate triangles, quadrilateral strips, separate quadrilaterals, or other types of polygons. CPU 6 may store the list of drawing primitives in device memory 8.

CPU 6 may communicate the list of drawing primitives to GPU 10 as a series of vertex points or attributes that define characteristics of the vertex points. For example, CPU 6 may invoke a graphics application programming interface (API) to communicate the list of drawing primitives to GPU 10 via a GPU driver. The graphics API may comprise a set of software instructions that provide an interface between CPU 6 and GPU 10. The graphics API may cause the GPU driver to formulate and issue one or more commands that cause GPU 10 to render to drawing primitives to displayable graphics information. The commands may specify an operation to perform on the primitive, such as rendering. Additionally, the commands may include positional coordinates of vertex points of the primitive, color information associated with each vertex point of the primitive, texture information associated with each vertex point of the primitive, scaling information for the primitive, rotation information for the primitive, and the like. The information associated with the vertex points of the primitives may be referred to as vertex "attributes." Instead of include the vertex attributes within the command, the command may specify an address within device memory 8 at which the vertex attributes may be stored.

GPU 10 receives a command from CPU 6 and configures one or more processing elements of GPU 10 to perform the operation specified in the command. Each of the graphics pipelines of GPU 10 may perform a number of graphics operations on respective vertex points. For example, each of the graphics pipelines may be configured to compute positional coordinates of vertex points along the curve to be rendered in a model space, also known as a user space or object space. GPU 10 may, for example, configured to compute the vertex points in the model space using a mathematical equation associated with the type of curve and the control points specified by CPU 6. As another example, each of the graphics pipelines may be configured to transform the curve or positional coordinate (or positional attribute) of the vertex points on the curve into a different coordinate system. In particular, GPU 10 may transform the curve or positional coordinates (or attributes) of the vertex points on the curve from the model or user coordinate space to a display or surface coordinate space (sometimes referred to as the device coordinate space). The model coordinate space represents how a graphics image is defined by the instructions of the software application utilizing graphics processing. Typically, the positional coordinate of the input vertex point may be represented in the model coordinate space using floating point numbers. The display coordinate space, on the other hand, may represent how the graphics image will be displayed on a device, e.g., display 16. The positional coordinate of the transformed vertex point may be represented in the display coordinate space using integer numbers that correspond to pixel locations on display 16. The positional coordinate of the transformed vertex point may, however, be represented in the display coordinate space using floating point numbers.

In some instances, positional coordinates of two or more input vertex points in the model coordinate space may correspond to substantially the same positional coordinate in the display coordinate space. As such, GPU 10 may generate vertex points in the display coordinate space that are repetitive. This problem may be exacerbated by the parallel structure of GPU 10. In other words, because GPU 10 operates on multiple input vertex points in full parallel, the repetitive vertex points in the display coordinate system may be processed through the graphics pipeline. This results in inefficient use of the available hardware as well as a reduction in the speed at which the image is rendered to display 16.

GPU 10 may, in accordance with one aspect of this disclosure, remove one or more vertex points from the graphics pipelines to more efficiently utilize the hardware resources of GPU 10 and increase the speed at which the image is rendered to display 16. For example, GPU 10 may remove repetitive (or redundant) vertex points, e.g., vertex points that have substantially the same positional coordinates in the display coordinate space. For example, two vertex points may be considered repetitive or redundant vertex points if the two vertex points are within ⅛ of a pixel from each other, i.e., their positional coordinates in the display coordinate space differ by less than 0.125. To remove redundant vertex points from the graphics pipelines, GPU 10 may compare each of the positional coordinates of each vertex point with positional coordinates of a previous vertex point and discard vertex points that have substantially the same positional coordinates in the display coordinate space as the previous vertex point, e.g., discard vertex points when a difference between the positional coordinates is less than a threshold, such as 0.125. In this manner, GPU 10 may omit processing of redundant information that is unnecessary to render a primitive.

Alternatively or additionally, GPU 10 may remove selected vertex points that have positional coordinates in the display coordinate space that lie in a straight line. Such a situation occurs when the portion of the curve represented by three or more vertex points has little or no curvature. In such a case, the straight portion of the curve may be represented equally well using a straight line from the first vertex point of the portion of the curve to the last vertex point of the portion of the curve instead of as a series of straight line segment between each intermediate vertex point along the portion of the curve. In other words, the straight line may be equally well established using only two vertex points of the set of vertex points of the line. The intermediate or excess vertex points may be removed.

If the straight portion of the curve included three vertex points, the straight portion of the curve may be represented equally well using a straight line from the first vertex point to the third vertex point of the portion of the curve instead of as a series of two straight line segments, e.g., a first straight line segment from the first vertex point to the second vertex point and a second straight line segment from the second vertex point to the third vertex point. GPU 10 may, for example, compare slopes of the first and second line segments formed by the consecutive vertex points and remove the middle (second) vertex point when the slopes are substantially the same, e.g., within a tolerable threshold.

After discarding the transformed vertex points, GPU 10 forms primitives using the remaining transformed vertex points. In one instance, GPU 10 may form primitives using the remaining transformed vertex points as if the discarded vertex point was never available. After generating the primitives, GPU 10 may perform additional graphics operations on the primitives to render the image to display 16.

As described above, CPU 6 and GPU 10 may function together to render the curves to display 16. In the example described above, CPU 6 tessellates the curve into segments and GPU 10 performs operations on the segments to render the segments to display 16. In other instances, however, the rendering functions may be allocated differently between CPU 6 and GPU 10. For example, GPU 10 may perform the tessellation in addition to other operations. The rendering functions may be allocated between CPU 6 and GPU 10 based on a processing load of CPU 6, a processing load of GPU 10, or the like.

Additionally, computing device 2 may include a number of other elements. For example, computing device 2 may include appropriate modulation, demodulation, frequency conversion, filtering, and amplifier components for transmission and reception of encoded video, as applicable, including radio frequency (RF) wireless components and antennas sufficient to support wireless communication. As such, computing device 2 may comprise a handheld wireless communication device. For ease of illustration, however, these additional elements are not specifically illustrated in FIG. 1. Instead, the architecture illustrated in FIG. 1 is merely exemplary. The techniques described in this disclosure may be implemented with a variety of other architectures.

Figure 2:
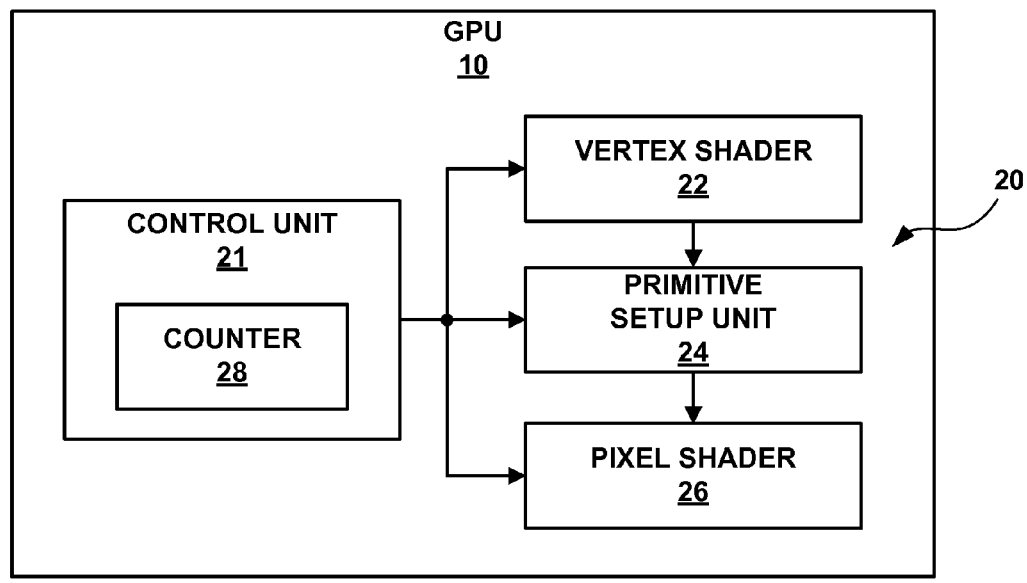
FIG. 2 is a block diagram illustrating a graphics processing unit in further detail.

FIG. 2 is a block diagram illustrating GPU 10 of FIG. 1 in further detail. GPU 10 includes a graphics pipeline 20 that includes a control unit 21, vertex shader 22, primitive setup unit 24 and pixel shader 26. As described above, GPU 10 may have a highly-parallel structure that provides more efficient processing of complex graphics-related operations. As such, although only one graphics pipeline 20 is illustrated in FIG. 2, GPU 10 may include a plurality of similar graphics pipelines that operate on multiple sets of vertex points (e.g., primitives) in parallel. In other words, GPU 10 may include a plurality of vertex shaders 22, primitive setup units 24 and pixel shaders 26 that may operate on several data primitives in full parallel. The highly parallel nature of GPU 10 may, in some instances, allow GPU 10 to create complex, 2D or 3D graphics images on display 16 more quickly than drawing the graphics images directly to display 16 with CPU 6. In one instance, GPU 10 may be designed for rendering 3D graphics.

GPU 10 may operate in conjunction with CPU 6 to render a 2D or 3D graphic image for display. Control unit 21 of GPU 10 receives a command from CPU 6 instructing GPU 10 to perform an operation on one or more vertex points that define a primitive. Control unit 21 decodes the command and configures one or more processing elements of GPU 10 to perform the operation specified in the command. Control unit 21 may additionally store information (e.g., primitive or vertex information) contained within the command in GPU memory 12 (FIG. 1) or within one or more buffers (not shown) within GPU 10 or within the processing elements of GPU 10. Control unit 21 may load into each of the processing elements of GPU 10 a set of instructions that cause the processing elements to perform particular graphics processing operations. In the example illustrated in FIG. 2, the processing elements of GPU 10 include vertex shader 22, primitive setup unit 24, and pixel shader 26. Other processing elements may also be included in GPU 10, but are not specifically illustrated in FIG. 2 for simplicity and ease of illustration.

Vertex shader 22, primitive setup unit 24, and pixel shader 26 may operate as a pipeline. When operating as a pipeline, vertex shader 22 performs a first set of one or more graphics operations on a first set of input data and outputs a first set of intermediate results. Primitive setup unit 24 performs a second set of one or more graphics operations on the intermediate results output by vertex shader 22 and outputs a second set of intermediate results. While primitive setup unit 24 performs the second set of graphics operations, vertex shader 22 performs the first set of graphics operations on a second set of initial input data. Graphics processing continues in a similar manner until the graphics image is generated for display.

Vertex shader 22 may be configured to obtain a sequence of vertex attributes that define one or more vertex points generated by CPU 6. Vertex shader 22 may retrieve the sequence of vertex attributes from device memory 8 (FIG. 1). The command received from CPU 6 may indicate a location within device memory 8 at which the vertex attributes are stored. Alternatively, CPU 6 may include the vertex attributes within the command or in one or more subsequent commands.

The vertex attributes may include a position attribute, one or more color attributes, one or more texture attributes, one or more lighting attributes, one or more transparency attributes and the like. The positional attribute may be an index number that indicates a sequential position of the current vertex point in a sequence of vertex points. When a curve has N vertex points, for example, the index number comprises an integer from 0 to N. Alternatively, the positional attribute of the vertex points may be a positional coordinate that represents a location of a point that lies on the curve in the model space, e.g., ($x_o$, $y_o$) coordinate for 2D. The positional attribute of the vertex points may, for example, be computed by CPU 6 using a mathematical representation corresponding to the particular command segment, which may be specified in the graphics authoring specification (e.g., OpenVG). For a curve that is defined using OpenVG as an elliptical arc curve, for example, the positional attributes of the vertex points may be computed using the equations:

$$x_o = -a*\cos(\theta) \quad (1)$$

$$y_o = b*\sin(\theta), \quad (2)$$

where ($x_o$, $y_o$) is a positional coordinate of a vertex point on the curve in the model space, a is a semi-major axis of the ellipse, b a semi-minor axis of the ellipse and $0 \leq \theta \leq 2\pi$. CPU 6 may send variables a, b, and θ to GPU 10 along with equations (1) and (2). As described above, the model coordinate space represents, typically using floating point numbers, how a graphics image is defined by the instructions of a software application utilizing graphics processing.

Based on the position attribute, vertex shader 22 determines positional coordinates in a display coordinate space. The display coordinate space (sometimes referred to as user or device coordinate space) represents how the graphics image will be displayed on a device, e.g., display. Because display 16 is made up of an array of an integer number of physical pixels, the positional coordinate in the device coordinate space (x, y) map to pixel locations on display 16. Vertex shader 22 may compute the positional coordinates of the vertex point using the same mathematical equations that represent the curve defined by the graphical software application, but with variables (or control points) transformed into the display coordinate space, as described in further detail below.

Vertex shader 22 may perform a number of other operations on the other input vertex attributes. Vertex shader 22 may perform one or more operations to change one or more of the color attributes, texture attributes, lighting attributes, or transparency attributes of the vertex point. For simplicity, this disclosure only describes the transformation of positional coordinates of the vertex point. It should be understood, however, that vertex shader 22 may perform other operations on other vertex attributes.

To more efficiently utilize the hardware resources of GPU 10 and increase the speed at which the image is rendered to display 16, vertex shader 22 may remove one or more vertex points. Vertex shader 22 may, for example, remove spatially repetitive (or redundant) vertex points, remove excess vertex points that lie on a straight line, or both.

Because positional coordinates in the display coordinate space correspond to an integer number of pixel locations, two or more vertex points may, in some instances, map to the same pixel location. In other words, two or more vertex points may have substantially the same positional coordinates in the display coordinate space. For example, two or more vertex points in the model coordinate space or represented by two consecutive index numbers may, when transformed by vertex shader 22, correspond to substantially the same positional coordinate in the display coordinate space. As such, GPU 10 may generate more than one vertex point that corresponds with a particular pixel location. In this manner, GPU 10 may generate repetitive vertex points in the display coordinate space. The vertex points in the display coordinate space may be considered redundant information that is unnecessary to render the primitive.

Due to the parallel structure of GPU 10, the processing elements of GPU 10 may operate on vertex points that are unnecessary for rendering the primitive in parallel with the vertex points that are needed in rendering the primitive. For example, GPU 10 may operate on repetitive vertex points or excess vertex points that lie on a straight line, resulting in inefficient use of the available hardware as well as a reduction in the speed at which the image is rendered to display 16. Instead of operating on repetitive or otherwise excess vertex points, it would be more efficient if GPU 10 discards the repetitive vertex points, e.g., the vertex points that correspond to substantially the same positional coordinate in the display coordinate space, thus allowing GPU 10 to utilize its hardware resources for operating on non-repetitive vertex points.

To this end, vertex shader 22 may, in accordance with one aspect of this disclosure, remove one or more vertex points. In one example, vertex shader 22 may remove vertex points that are redundant, e.g., have identical or substantially the same positional coordinates in the display coordinate space, from the graphics pipelines to more efficiently utilize the hardware resources of GPU 10 and increase the speed at which the image is rendered to display 16. In one aspect, vertex shader 22 may compute positional coordinates for the current vertex point as well as positional coordinates for at least one previous vertex point. Vertex shader 22 compares the positional coordinates (i.e., the positional coordinates in the display coordinate space) of the current and previous vertex points and discards the current vertex point when the positional coordinates of the current and previous vertex points are substantially the same. When the current vertex point is discarded by vertex shader 22, vertex shader 22 may not provide any output. Alternatively, vertex shader 22 may output a signal indicating that the current vertex point has been discarded. The signal may allow the next processing stage of the pipeline to know it will not be receiving a vertex point and the resources may be freed up for other operations.

When the positional coordinates of the current and previous vertex points in the display coordinate space are not substantially the same, vertex shader 22 outputs the vertex attributes, including the positional coordinates in the display coordinate space, of the current vertex point. In this case, the positional coordinates of the at least one previous vertex point are used for determining whether the current vertex point is redundant. GPU 10 may execute a similar process for all N+1 vertices in parallel.

In configuring vertex shader 22, control unit 21 may load into vertex shader 22 a set of instructions that cause vertex shader 22 to perform the functions described above. As will be described in further detail below, vertex shader 22 may be loaded with instructions that define mathematical equations for computing positional coordinates of the curve in the model space and/or the display coordinate space, as well as any variables necessary in computing the positional coordinates. Below is example pseudo code that may be loaded into vertex shader 22 and used to remove repetitive vertex points.

```
uniform float radius;
uniform float N;
attribute int index;
float x(float t){
    return radius * cos(t);
}
float y(float t){
    return radius * sin(t);
}
void main(void){
```

```
    float t = ((float)index)/N;
    float delta t = 1.0/N;
    int x_curr = (int)x(t);
    int y_curr = (int)y(t);
    int x_prev = (int)x(t-delta_t);
    int y_prev = (int)y(t- delta t);
    if( (x_curr == x_prev) && (y_curr == y_prev)
    ){
        discard;
    }
    gl_Position.x = (float)x_curr;
    gl_Position.y = (float)y_curr;
}
```

In the example pseudo code above, vertex shader 22 is configured with instructions that cause vertex shader 22 to obtain the positional coordinates of the current and previous vertex points using a position attribute (index) that represents the index or sequence number. In the example pseudo code, vertex shader 22 is configured to compute the positional coordinates for a circular arc of one radian with a starting angle of zero. In particular, vertex shader 22 is configured with a radius of the circular arc, a maximum index value N, mathematical equations defining x and y positional coordinates in the model space for curve defined by the graphical software application, i.e., x=radius*cos(t) and y=radius*sin(t), respectively.

Vertex shader 22 computes a floating point value t based on the position attribute (index) and the maximum index value (N). Vertex shader 22 also computes a step-size (delta) of the variable t as being 1/N, which represents a uniform step size. In other instances, the step-size may be adaptive based on the curvature of the curve. Using the computed floating point value t, vertex shader 22 computes an x-axis positional coordinate in the display coordinate space (x_curr) and a y-axis positional coordinate in the display coordinate space (y_curr). In particular, vertex shader 22 computes x_curr as an integer value of radius*cos(t), where t is equal to the floating point value of index/N. In other words, vertex shader 22 rounds the value output by the equation radius*cos(t) to the nearest integer value. Likewise, vertex shader 22 computes y_curr by rounding the value output by the equation radius*sin(t) to the nearest integer value. In this manner, vertex shader 22 transforms the positional coordinates in the model coordinate space to positional coordinates in the display coordinate space by rounding the positional coordinates in the model coordinate space to the nearest integer value.

Additionally, vertex shader 22 may likewise compute a positional coordinate in the display coordinate space for the previous vertex point (x prev, y prev). In particular, vertex shader 22 computes x_prev by rounding the value output by the equation radius*cos(t−delta) to the nearest integer value and computes y_prev by rounding the value output by the equation radius*sin(t−delta) to the nearest integer value. Although in the example pseudo code above, vertex shader 22 transforms the positional coordinates in the model coordinate space to positional coordinates in the display coordinate space by rounding the positional coordinates in the model coordinate space to the nearest integer value, vertex shader 22 may keep the positional coordinates in the display coordinate space as floating point numbers. Additionally, vertex shader 22 may perform other transformation operations during the transformation process, such as scaling, rotation or the like. In this case, other mathematical operations may be performed in addition to rounding of the floating point value to the nearest integer value.

Vertex shader 22 compares the computed positional coordinates of the current vertex point to the computed positional coordinates of the previous vertex point and discards the current vertex point when positional coordinates are the same in the display coordinate system. In other words, vertex shader 22 discards the current vertex point when both the x-axis positional coordinates are the same (x_curr=x_prev) and both the y-axis positional coordinates are the same (y_curr=y_prev). gl_Position.x is a floating point value that takes on a value equal to the position of the x-coordinate of the vertex and gl_Position.y is a floating point value that takes on a value equal to the position of the y-coordinate of the vertex. gl_Position.x and gl_Position.y allows vertex shader 22 to specify specific registers within which the vertex position is located. When the positional coordinates in the display coordinate space are represented as floating point numbers, discards the current vertex point when the difference between the values of the two vertex points are within ⅛ of a pixel from each other, i.e., their positional coordinates in the display coordinate space differ by less than 0.125 in both dimensions (e.g., x and y dimension). Although described above as occurring in the display coordinate space, vertex shader 22 may discard vertex points by performing the comparison in the model or user coordinate space.

In the example above, vertex shader 22 inputs an index value of the current vertex points as a vertex position attribute. The index value may take on an integer value from 0 to N, with each subsequent vertex point having the next index value of the sequence. In other words, if the index value of the current vertex point is "2," the index value of the previous vertex point is "1," the index value of the subsequent vertex point is "3" and so on. In one aspect of the techniques of this disclosure, GPU 10 may generate this sequence of integer numbers instead of reading this attribute from device memory 8 or receiving a command from CPU 6 that includes the attribute. Generating the sequence of integer numbers within GPU 10 may reduce the amount of bandwidth used on bus 18.

Control unit 21 may, for example, maintain a counter 28 that is used for counting processed vertex points from 0 to N. As such, control unit 21 typically increments counter 28 when vertex attributes of a vertex point are loaded into vertex shader 22. In some aspects, control unit 21 may use counter 28 as a source of the index attribute. For example, control unit 21 may provide the value of counter 28 as the index attribute for the current vertex point and increment the value of counter 28 by one upon loading the current index value into vertex shader 22. This results in a decrease in the amount of incoming bandwidth consumption on bus 18, as no positional vertex attribute needs to be loaded from device memory 8 or CPU 6.

Vertex shader 22 may, in some instances, reduce the number of vertex points from the set of vertex points received from CPU 6 by removing excess vertex points that lie on a substantially straight line. In other words, vertex shader 22 may remove intermediate vertex points that substantially lie on a straight line established using a previous vertex point and a subsequent vertex point. As described in this disclosure, the intermediate or excess vertex points that lie on the straight line may be unnecessary for rendering the primitive. Vertex shader 22 may remove excess or intermediate vertex points that lie on a substantially straight line without removing redundant vertex points or in addition to removing redundant vertex points.

To remove the excess or intermediate vertex points on the straight line, vertex shader 22 may compute positional coordinates in the display coordinate space for a current vertex point as well as for a previous vertex point and a subsequent vertex point in the case of a straight line segment with three vertex points. Similar techniques may be used with a straight line segment with more than three vertex points. Vertex shader 22 may compute the positional coordinates of the vertex points in the same manner as described in detail above. As one example, vertex shader 22 may compute positional coordinates in the display coordinate space for the current vertex point (x_curr, y_curr) and the previous vertex point (x prev, y prev) as described in the example pseudo code above, and further compute the transformed positional coordinate of the subsequent vertex point (x_subs, y_subs) using t=t+delta.

After computing the transformed positional vertex points for the previous, current and subsequent vertex points, vertex shader 22 determines whether the transformed positional vertex points lie on a substantially straight line. To do so, vertex shader 22 may compare a slope of a line segment connecting the positional coordinates of the current vertex point and the previous vertex point with a slope of a line segment connecting the positional coordinates of the subsequent vertex point and the current vertex point. When the slopes of both line segments are substantially equal (e.g., within a tolerable difference or "THR" in equation (3) below), vertex shader 22 determines that the vertex points lie on a substantially straight line. Vertex shader 22 may, for example, determine that the transformed positional vertex points lie on a straight line when:

$$((x\_curr - x\_prev)*(y\_curr - y\_subs)) - ((x\_curr - x\_subs)*(y\_curr - y\_prev)) \leq THR \quad (3)$$

When vertex shader 22 determines that the transformed positional coordinates of the vertex points lie on a substantially straight line (i.e., less than or equal to THR), vertex shader 22 discards the current vertex point. In some instances, vertex shader 22 may tolerate a particular degree of error in determining whether the vertex points lie on a straight line.

In some instances, GPU 10 may compute higher derivatives of the curve and use the higher derivatives in determining whether to discard the vertex point. For example, GPU 10 may compute a second derivative that represents the curvature (e.g., slope) of the curve and determine whether to discard the vertex point based on the curvature of the curve at the location of the vertex point. For example, GPU 10 may determine to not discard the vertex point if the curvature of the curve has a high value at the location of the vertex point.

When vertex shader 22 determines to keep the current vertex point, e.g., the vertex point is not a duplicate or redundant vertex point or does not lie in a straight line with neighboring vertex points, vertex shader 22 outputs the transformed vertex point or attributes defining the transformed vertex points. In one instance, vertex shader 22 may provide the output vertex point or attributes defining the transformed vertex point directly to the next stage in graphics pipeline 20, e.g., primitive setup unit 24. In other instances, vertex shader 22 may store the transformed vertex point or attributes defining the transformed vertex point to a memory, such as GPU memory 12 or device memory 8.

In the example described above, vertex shader 22 uses the previous and/or subsequent vertex points to make a determination about the current vertex point. In other words, vertex shader 22 computes the positional coordinates of the previous and or subsequent vertex points in order to determine whether a vertex is a duplicate of the previous vertex point or lies in a straight line with the previous vertex point and the subsequent vertex point. Thus, for each vertex point on the curve, vertex shader 22 performs two or more additional "overhead" computations to transform the current vertex point. For example, to determine whether the positional coordinates of the current vertex point are substantially the same as the positional coordinates of the previous vertex point, vertex shader 22 transforms the positional coordinates of the previous vertex point in addition to transforming the positional coordinates of the current vertex point. This may results in 100% increase in overhead computation (e.g., a 100% increase in the number of operations performed), assuming the only operation that would have been performed is transforming the positional coordinates of the current vertex point. As another example, to determine whether the positional coordinates of the current vertex point lie in a straight line with the previous and subsequent vertex points, vertex shader 22 transforms the positional coordinates of the previous vertex point, the current vertex point and the subsequent vertex point. This may results in a 200% increase in overhead computation, assuming the only operation that would have been performed is transforming the positional coordinates of the current vertex point. These overhead computations may, however, eliminate a number of other more complex computations performed later in graphics pipeline 20.

In some instances, vertex shader 22 may be configured to reduce this overhead computation by transforming multiple vertex points. As an example, vertex shader 22 may be configured to transform four vertex points concurrently. In this example, vertex shader 22 may obtain an index value (i) and compute positional coordinates for five vertex points, e.g., vertex points corresponding to index values of i−1, i, i+1, i+2, and i+3. Vertex shader 22 may compare the positional coordinates of each of the vertices i, i+1, i+2, and i+3 with the positional coordinates of each of the previous vertex points corresponding with index values i−1, i, i+1, and 1+2, respectively, to determine whether any of the vertex points are duplicates. Vertex shader 22 may output up to four transformed vertex points (if none are duplicates). In this manner, vertex shader 22 may reduce the computation overhead from 100% (one overhead computation per input vertex point) to 25% (one overhead computation per four input vertex points).

Primitive setup unit 24 generates primitives using the transformed vertex points. Primitive setup unit 24 may, for example, generate triangle primitives using sets of three transformed vertex points, e.g., triangle strips, triangle fans, or separate triangles. In other instances, however, primitive setup unit 24 may generate other types of primitives using less than three transformed vertex points or more than three transformed vertex points. For example, other primitives that may be generated by primitive setup unit 24 include points, line strips, line loops, separate lines, quadrilateral strips, separate quadrilaterals, or other types of polygons. For purposes of illustration, this disclosure describes primitive setup unit 24 as generating triangle fan primitives. However, the techniques as broadly described herein should not be limited to triangle fan primitives, but instead may be used for any types of primitives.

A triangle fan is a series of connected triangles. Each of the connected triangles of the triangle fan shares two common vertex points with each neighboring triangle, i.e., a root vertex point and at least one other vertex point. To generate a triangle fan primitive, for example, primitive setup unit 24 defines a root vertex point. The root vertex point generated by primitive setup unit 24, in most instances, is not located on the curve that defines the object. Instead, the root vertex may be located adjacent to a concave portion of the curve that defines the object. To generate the triangle fan primitive, primitive setup unit 24 connects the root vertex point with two vertex points that lie on the curve that defines the object. In this manner, each of the triangle primitives generated by primitive setup unit 24 shares a root vertex point and at least one vertex point that lies on the curve defining the object. Thus, primitive setup unit 24 may generate a triangle fan with N triangle primitives using only N+2 vertex points.

Conventionally, when a vertex point is discarded, primitive setup unit 24 discards all primitives that contain the discarded vertex point. In the case of a triangle fan, for example, primitive setup unit 24 discards two adjacent triangle primitives for each vertex point that is discarded. In some instances, such as when a pixel is discarded because it is repetitive or because the current vertex point lies in a straight line connecting neighboring vertex points, it may be undesirable to discard all the primitives that contain the discarded pixel. Therefore, primitive setup unit 24 may not discard all the primitives that include the discarded vertex point. Instead, primitive setup unit 24 may setup the primitives as if the discarded vertex point was never a vertex point. In the case of a triangle fan, for example, primitive setup unit 24 may generate a triangle primitive using the root vertex of the triangle fan, the previous non-discarded vertex point, and the first non-discarded vertex that comes after the discarded vertex point. Thus, instead of discarding the two adjacent triangle primitives that include the discarded vertex point, primitive setup unit 24 forms a single triangle primitive in place of the two adjacent triangle primitives.

Pixel shader 26 converts the primitives output by primitive setup unit 24 into pixels based on the vertex attributes. Pixel shader 26 may, for example, perform clipping operations on the primitives and determine which of the pixels in the screen are within the geometry of the object and therefore need to be drawn. Additionally, pixel shader 26 may perform interpolation of vertex attributes of the vertex points of a primitive to generate the pixel data. Pixel shader 26 may additionally perform per-pixel texturing, fog and coloring operations to generate a color value to display at each pixel location.

The architecture illustrated in FIG. 2 is merely exemplary, as the techniques described in this disclosure may be implemented with a variety of other architectures. For example, GPU 10 may utilize a single shader core that may perform the functions attributed to vertex shader 22 and pixel shader 26. The single shader core may, for example, be configured by control unit 21 to function as vertex shader 22 or pixel shader 26 based on the stage of the pipeline at which the graphics operations are at. Moreover, the features illustrated in FIG. 1 may be realized by any suitable combination of hardware and/or software components.

Figure 3:
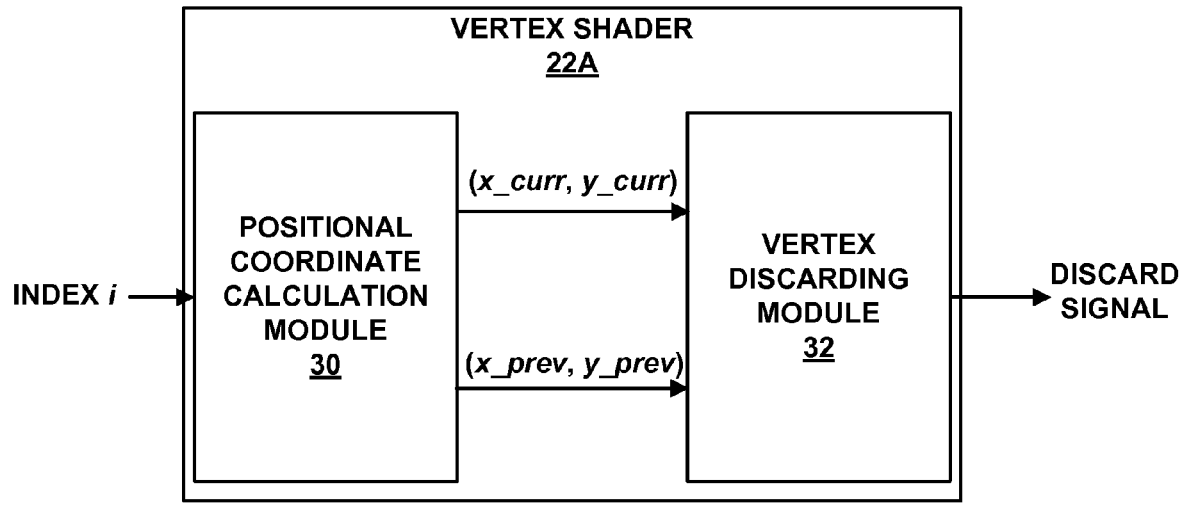
FIG. 3 is a block diagram of an example vertex shader that discards one or more vertex points in accordance with the techniques of this disclosure.

FIG. 3 is a block diagram of an example vertex shader 22A that discards one or more vertex points in accordance with the techniques of this disclosure. Vertex shader 22A may, for example, correspond with vertex shader 22 of FIG. 2. Vertex shader 22A includes a positional coordinate calculation module 30 that computes positional coordinates in the display coordinate space for a current vertex point and at least one additional vertex point and vertex discarding module 32 that determines whether to discard any of the computed vertex points.

Positional coordinate calculation module 30 obtains one or more vertex attributes that represent at least one vertex point. In the example of FIG. 3, positional coordinate calculation module 30 obtains an index attribute i that indicates a position of the vertex point among the other vertex points. Positional coordinate calculation module 30 computes positional coordinates in the display coordinate space for the vertex point associated with the index attribute, i.e., the current vertex point. Positional coordinate calculation module 30 also computes positional coordinates in the display coordinate space for at least one other vertex point e.g., a previous vertex point. As described in detail above with respect to FIG. 2, positional coordinate calculation module 30 may compute the positional coordinates using mathematical equations that represent the curve defined by the graphical software application and variables computed as a function of the index attribute i. The positional coordinates of the current and previous vertex point are represented in FIG. 3 as (x_curr, y_curr) and (x_prev, y_prev), respectively.

Vertex discarding module 32 receives the computed positional coordinates of the current and previous vertex points. Vertex discarding module 32 compares the computed positional coordinates of the current vertex point to the computed positional coordinates of the previous vertex point and discards the current vertex point when positional coordinates in the display coordinate space are substantially the same. In other words, vertex discarding module 32 discards the current vertex point when x_curr=x_prev and y_curr=y_prev. In this manner, vertex shader 22A removes redundant vertex points in the display coordinate space.

Upon discarding the current vertex point, vertex discarding module 32 may output a discard signal indicating that the current vertex point was discarded. Alternatively, vertex discarding module 32 may not output any signal when the current vertex point is discarded. When vertex discarding module 32 does not discard the current vertex point, i.e., the positional coordinates of the current and previous vertex point in the display coordinate space are different, vertex discarding module 32 outputs the positional coordinates of the current vertex point (x_curr, y_curr).

Although positional coordinate calculation module 30 is described in terms of computing positional coordinates for the current and previous vertex points based on the received index attributes, positional coordinate calculation module 30 may receive other position attributes for use in computing the positional coordinates for the current and previous vertex points in the display coordinate space. For example, positional coordinate calculation module 30 may receive position coordinates of the current and previous vertex points in the model coordinate space, and compute the positional coordinates of the current and previous vertex point in the display coordinate space using transform equations. In yet another example, positional coordinate calculation module 30 may only calculate positional coordinates of a current vertex point in the display coordinate space. In this case, positional coordinate calculation module 30 may receive previously computed positional coordinates of the previous vertex point in the display coordinate space for comparison.

Figure 4:
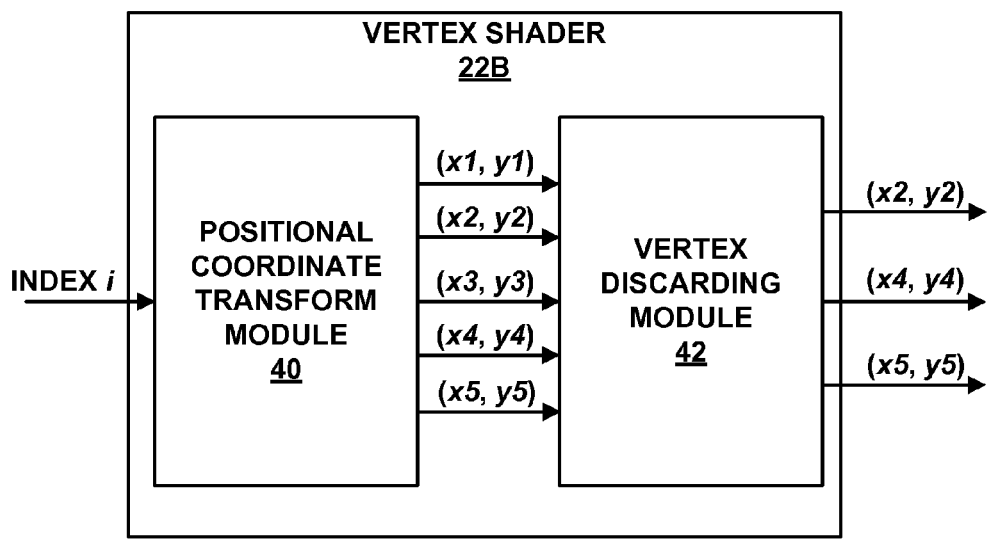
FIG. 4 is a block diagram of an example vertex shader that outputs a plurality of vertex points in accordance one aspect of this disclosure.

FIG. 4 is a block diagram of an example vertex shader 22B that outputs a plurality of vertex points in accordance one aspect of this disclosure. Vertex shader 22B may, for example, correspond with vertex shader 22 of FIG. 2. Vertex shader 22B includes a positional coordinate calculation module 40 that computes positional coordinates in the display coordinate space for a plurality of vertex points and vertex discarding module 42 that determines whether to discard any of the computed vertex points.

Positional coordinate calculation module 40 obtains one or more vertex attributes that represent at least one vertex point. In the example of FIG. 4, positional coordinate calculation module 30 obtains an index attribute i that indicates a position in a sequence of vertex points. Positional coordinate calculation module 40 computes positional coordinates in the display coordinate space for a plurality of vertex points. In the example of FIG. 4, positional coordinate calculation module 40 computes pixel coordinates of five vertex points; (x1, y1), (x2, y2), (x3, y3), (x4, y4) and (x5, y5). As described in detail above with respect to FIG. 2, positional coordinate calculation module 40 may compute the positional coordinates using mathematical equations that represent the curve defined by the graphical software application and variables computed as a function of the index attribute i.

Vertex discarding module 42 receives the computed positional coordinates of the plurality of vertex points and determines whether to discard any of the vertex points. Vertex discarding module 42 may, for example, compare each of computed positional coordinates of vertex points (x2, y2) through (x5, y5) to positional coordinates of previous vertex points (x1, y1) through (x4, y4), respectively. Vertex discarding module 42 discards the vertex points that have positional coordinates in the display coordinate space that are substantially the same as the corresponding previous vertex point. In this manner, vertex shader 22B removes redundant vertex points in the display coordinate space.

Vertex discarding module 42 may additionally determine whether at least some of the vertex points lie on a straight line with adjacent vertex points. In the example of FIG. 4, vertex discarding module 42 may determine whether positional coordinates of vertex points (x2, y2) through (x4, y4) lie on a straight line. To do so, vertex discarding module 42 may compare a slope of a line segment connecting the positional coordinates of vertex point (x2, y2) and the positional coordinates of the previous vertex point (x1, y1) with a slope of a line segment connecting the positional coordinates of the subsequent vertex point (x3, y3) and the positional coordinates of the vertex point (x2, y2). When the slopes of both line segments are substantially equal (e.g., within a tolerable difference), vertex discarding module 42 determines that the vertex points lie on a substantially straight line and discards vertex point (x2, y2). Vertex discarding module 42 performs the same analysis of the positional coordinates of vertex points (x3, y3) and (x4, y4). Vertex discarding module 42 may not perform the line analysis for the positional coordinates of vertex points (x1, y1) and (x5, y5) because there are no positional coordinates for a previous vertex point before (x1, y1) and no positional coordinates for a subsequent vertex point after (x5, y5) to use to compute the slopes of the line segments.

Vertex discarding module 42 may output positional coordinates for up to four vertex points if there are no vertex points discarded. In the example illustrated in FIG. 4, vertex discarding module 42 discards positional coordinates of the vertex point (x3, y3), e.g., because it is a duplicate or lies in a straight line with its neighboring vertex points. As such, vertex discarding module 42 outputs positional coordinates of three vertex points. By computing and outputting positional coordinates of multiple vertex points, vertex shader 22B may reduce the computation overhead. When vertex shader 22B may output positional coordinates for up to four vertex points, for example, vertex shader 22B may reduce the computation overhead from 100% (one overhead computation per input vertex point) to 25% (one overhead computation per four input vertex points). Although in the example described in FIG. 4 vertex shader 22B may output positional coordinates for up to four vertex points, vertex shader 22B may be configured to output positional coordinates for any number of vertex points. For example, vertex shader 22B may be configured to output positional coordinates for more or less than four vertex points.

Figure 5:
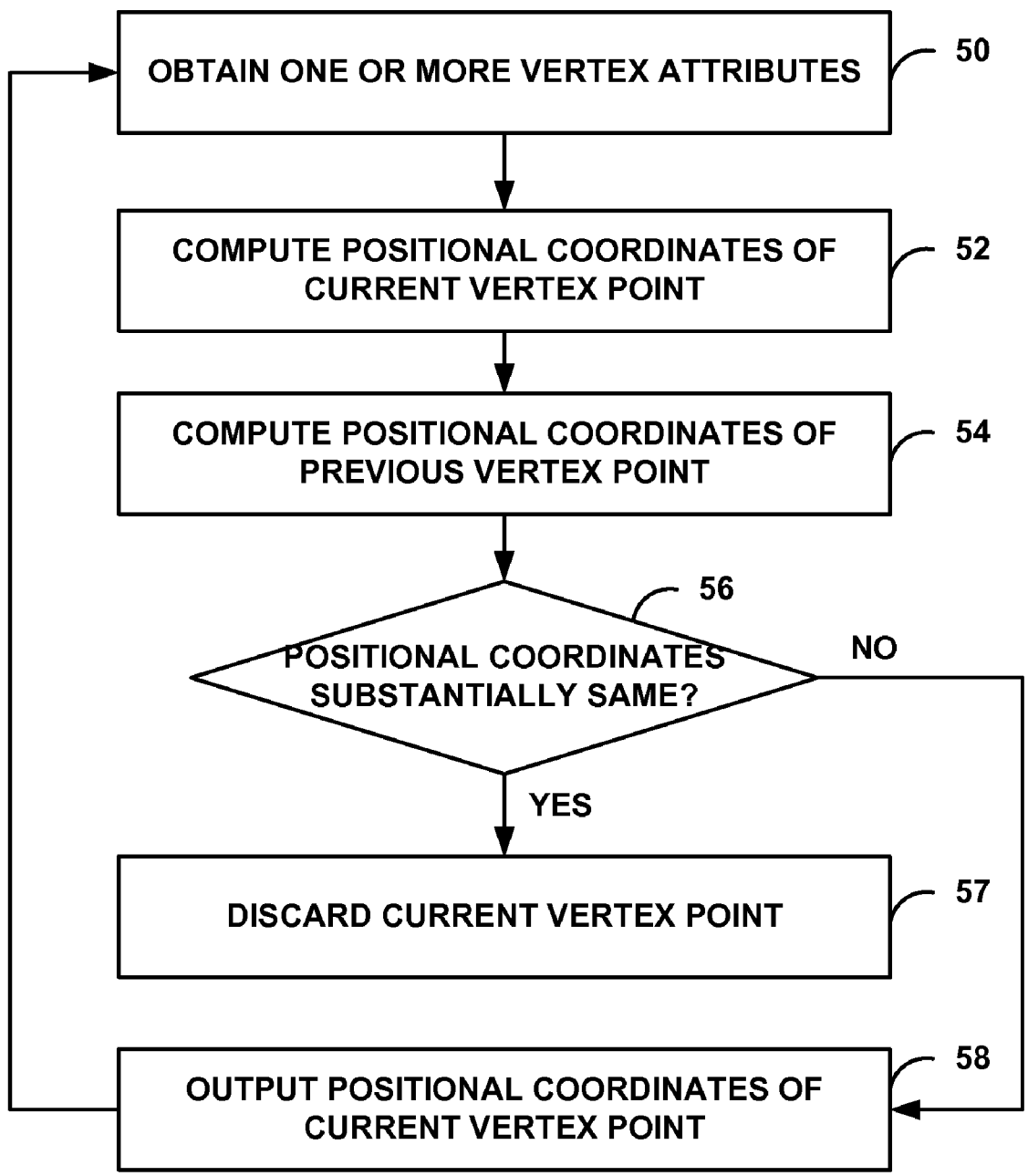
FIG. 5 is a flow diagram illustrating example operation of a vertex shader discarding repetitive vertex points in the display coordinate space.

FIG. 5 is a flow diagram illustrating example operation of a vertex shader 22 discarding repetitive vertex points in the display coordinate space. Vertex shader 22 may obtain one or more vertex attributes that define at least one vertex points that lies on a curve to be rendered (50). The vertex attributes include a position attribute, such as an index number associated with a current vertex point that indicates a position of the current vertex point in a sequence of vertex points. In another example, the position attribute may be positional coordinates, such as an (x, y) coordinate for a 2D curve or a (x, y, z) coordinate for 3D curve. The vertex attributes may additionally include other information associated with the vertex point, such as one or more color attributes, one or more texture attributes, one or more lighting attributes and the like. Vertex shader 22 may obtain the sequence of vertex attributes from device memory 8, from a command from CPU 6, or, in the case of the index number, from a counter 28 within GPU 10.

Vertex shader 22 computes a positional coordinate of the current vertex point in a display coordinate space (52). The current vertex point is the vertex point on which vertex shader 22 is currently operating. Vertex shader 22 also computes a positional coordinate of a previous vertex point in the display coordinate space (54). The previous vertex point may be the vertex point immediately preceding the current vertex point. In the case of an index attribute, for example, vertex shader 22 may compute the positional coordinates using mathematical equations that represent the curve defined by the graphical software application and variables computed as a function of the index attribute i, e.g., as shown and described with respect to the pseudo code of FIG. 2. The positional coordinates of the current and previous vertex points may represent locations on a display, e.g., pixel locations among an array of pixels, that will be used to present the curve on the display.

Vertex shader 22 determines whether the display positional coordinates of the current and previous vertex points are substantially the same (56). For example, vertex shader 22 may compare the computed display positional coordinates of the current vertex point to the computed display positional coordinates of the previous vertex point to determine whether the display positional coordinates are substantially the same, e.g., within a tolerable threshold. When the display positional coordinates are substantially the same, vertex shader 22 discards the current vertex point (57). In some instances, vertex shader 22 may output a discard signal indicating that the current vertex point was discarded. Alternatively, vertex shader 22 may output nothing, e.g., discard the vertex point without indicating to other modules or elements that the vertex point was discarded. In this manner, vertex shader 22 removes redundant vertex points in the display coordinate space.

When vertex shader 22 determines that the display positional coordinates are not substantially the same, vertex shader 22 outputs the positional coordinates of the current vertex point in the display coordinate space (58). Although the flow diagram of FIG. 5 describes vertex shader 22 making a determination as to whether or not to discard a single vertex point, vertex shader may be configured to make such a determination for more than one vertex point concurrently as described in detail above. For example, vertex shader 22 may be configured to determine whether to discard N vertex points concurrently by computing positional coordinates for the N vertex point as well as the positional coordinates of one vertex point immediately prior to the N vertex points. Vertex shader 22 may compare the positional coordinates of each of the N vertex points with the positional coordinates of corresponding previous vertex points to determine whether any of the N vertex points are duplicates. Vertex shader 22 may output up to N vertex points (if none are duplicates). In this manner, vertex shader 22 may reduce the computation overhead from 100% (one overhead computation per input vertex point) to 25% (one overhead computation per four input vertex points).

Figure 6:
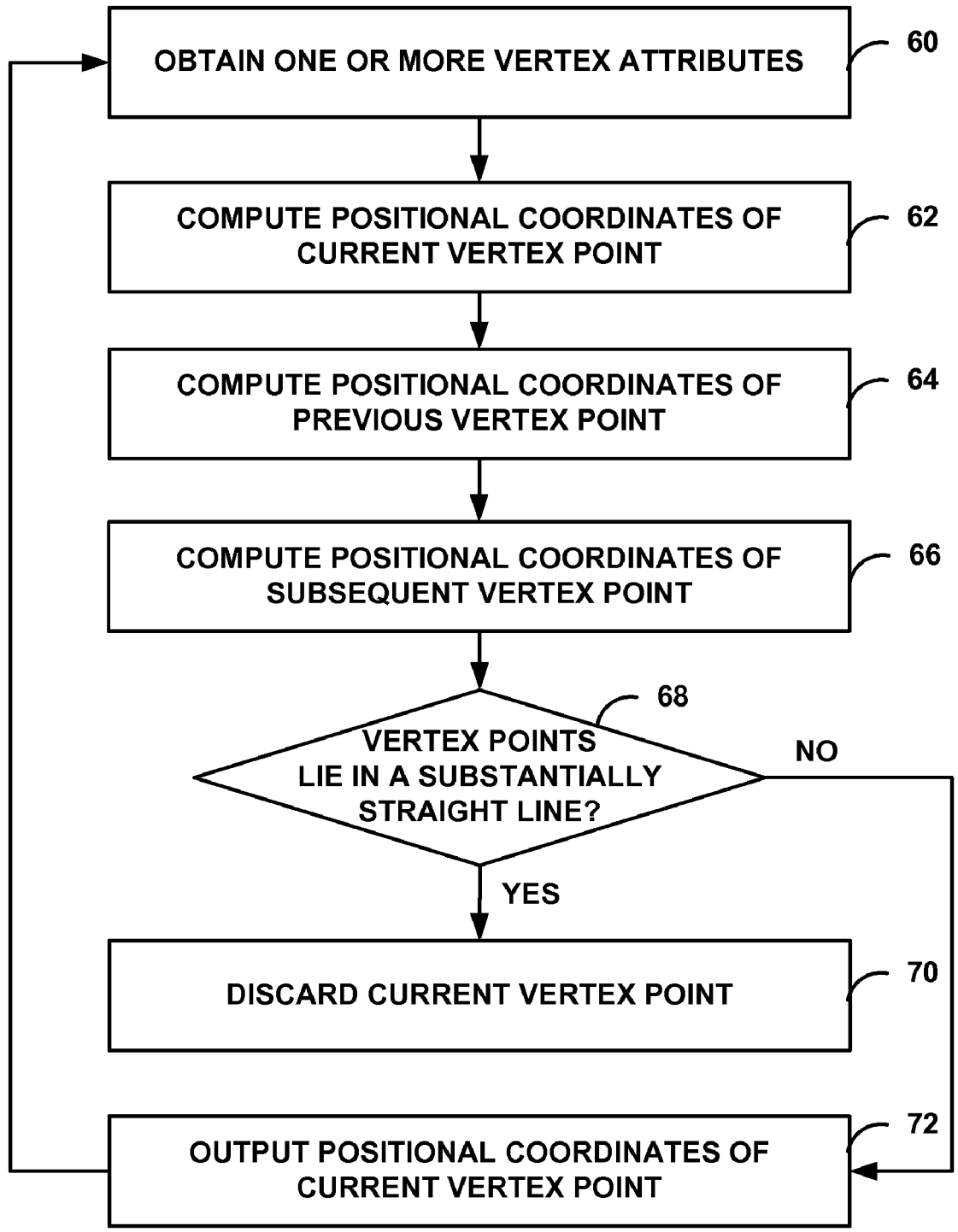
FIG. 6 is a flow diagram illustrating example operation of a vertex shader discarding at least some vertex points that lie in a straight line in the display coordinate space.

FIG. 6 is a flow diagram illustrating example operation of a vertex shader 22 discarding at least some vertex points that lie in a straight line in the display coordinate space. Vertex shader 22 may obtain one or more vertex attributes that define at least one vertex points that lies on a curve to be rendered (60). The vertex attributes include a position attribute, such as an index number associated with a current vertex point that indicates a position of the current vertex point in a sequence of vertex points. In another example, the position attribute may be positional coordinates, such as an (x, y) coordinate for a 2D curve or a (x, y, z) coordinate for 3D curve. The vertex attributes may additionally include other information associated with the vertex point, such as a normal attribute, one or more color attributes, one or more texture attributes, one or more lighting attributes and the like. Vertex shader 22 may obtain the sequence of vertex attributes from device memory 8, from a command from CPU 6, or, in the case of the index number, from within GPU 10.

Vertex shader 22 computes a positional coordinate of the current vertex point in a display coordinate space (62). The current vertex point is the vertex point that vertex shader 22 is currently operating on. Vertex shader 22 also computes a positional coordinate of a previous vertex point in the display coordinate space (64). The previous vertex point may be the vertex point immediately preceding the current vertex point. Vertex shader 22 also computes a positional coordinate of a subsequent vertex point in the display coordinate space (66). The subsequent vertex point may be the vertex point immediately following the current vertex point. In the case of an index attribute, for example, vertex shader 22 may compute the positional coordinates using mathematical equations that represent the curve defined by the graphical software application and variables computed as a function of the index attribute i, e.g., as shown and described with respect to the pseudo code of FIG. 2.

Vertex shader 22 determines whether the vertex points lie in a substantially straight line (68). For example, vertex shader 22 may compare a slope of a line segment connecting the positional coordinates of the current vertex point and the previous vertex point with a slope of a line segment connecting the positional coordinates of the subsequent vertex point and the current vertex point. When the slopes of both line segments are substantially equal (e.g., within a tolerable difference), vertex shader 22 determines that the vertex points lie on a substantially straight line.

When vertex shader 22 determines that the vertex points lie on a substantially straight line, vertex shader 22 discards the current vertex point (70). Discarding the current vertex point does not affect the image that is rendered to the display since the line segment connecting the previous and subsequent vertex points is the same as the line segments connecting the previous and current vertex point and current and subsequent vertex points. When vertex shader 22 determines that the vertex points lie on a substantially straight line, vertex shader 22 outputs the positional coordinates of the current vertex point in the display coordinate space (72). Vertex shader 22 may remove vertex points that lie on a substantially straight line without removing redundant vertex points or in addition to removing redundant vertex points as described with respect to FIG. 5.

The techniques described herein may be implemented in hardware, software, firmware, or any combination thereof. Any features described as modules or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software applications or hardware modules configured for tessellating graphics images. Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various aspects have been described. These and other aspects are within the scope of the following claims.

The invention claimed is:

1. A method comprising:
determining positional coordinates for each of a plurality of vertex points that lie on a curve to be rendered;
computing a first slope between positional coordinates of a first vertex point and positional coordinates of a second vertex point;
computing a second slope between the positional coordinates of the second vertex point and positional coordinates of a third vertex point; and
discarding one of the first, second, and third vertex points when the first and second computed slopes are substantially the same.

2. The method of claim 1, further comprising:
comparing first positional coordinates of a fourth vertex point of the plurality of vertex points with second positional coordinates of a fifth vertex point of the plurality of vertex points, wherein the fourth vertex point is immediately prior to the fifth vertex point; and
discarding the fifth vertex point when the first and second positional coordinates are substantially the same.

3. The method of claim 2, further comprising:
comparing third positional coordinates of a sixth vertex point of the plurality of vertex points with the second positional coordinates, wherein the fifth vertex point is immediately prior to the sixth vertex point; and
discarding the sixth vertex point when the second and third positional coordinates are substantially the same.

4. The method of claim 3, further comprising:
outputting the positional coordinates of the fifth vertex point when the first and second positional coordinates are not substantially the same; and
concurrently outputting the positional coordinates of the sixth vertex point when the second and third positional coordinates are not substantially the same.

5. The method of claim 1, wherein discarding the one of the first, second, and third vertex points comprises discarding at least one vertex point that substantially lies on a straight line formed by a previous vertex point and a subsequent vertex point.

6. The method of claim 1, wherein
discarding the one of the first, second, and the third vertex points comprises discarding the second vertex point when the first and second computed slopes are substantially the same.

7. The method of claim 6, further comprising:
comparing the positional coordinates of the first vertex point with the positional coordinates of the second vertex point; and
discarding the second vertex point when the positional coordinates of the first vertex point and the positional coordinates of the second vertex point are substantially the same.

8. The method of claim 1, further comprising obtaining an index value that indicates a sequential position of the current vertex point in the plurality of vertex points, wherein determining the positional coordinates comprises determining the positional coordinates in the display coordinate space for each of the plurality of vertex points as a function of the index value.

9. The method of claim 8, wherein obtaining the index value comprises obtaining the index value from a counter of a graphics processing unit (GPU).

10. The method of claim 1, further comprising rendering the curve to present the curve to a display.

11. The method of claim 1,
wherein the vertex points lie on a two-dimensional curve,
wherein computing the first slope comprises computing, with a vertex shader of a three-dimensional (3D) graphics processing unit (GPU), the first slope between the positional coordinates of the first vertex point and the positional coordinates of the second vertex point,
wherein computing the second slope comprises computing, with the vertex shader of the 3D GPU, the second slope between the positional coordinates of the second vertex point and the positional coordinates of the third vertex point, and
wherein discarding the one of the first, second, and third vertex points comprises discarding, with the vertex shader of the 3D GPU, the one of the first, second, and third vertex points when the first and second computed slopes are substantially the same.

12. The method of claim 1, further comprising:
discarding at least one of the plurality of vertex points that maps to the same pixel position as at least one other vertex point of the plurality of vertex points.

13. A device comprising a processing unit that:
determines positional coordinates for each of a plurality of vertex points that lie on a curve to be rendered;
computes a first slope between positional coordinates of a first vertex point and positional coordinates of a second vertex point;
computes a second slope between the positional coordinates of the second vertex point and positional coordinates of a third vertex point; and
discards one of the first, second, and third vertex points when the first and second computed slopes are substantially the same.

14. The device of claim 13, wherein the processing unit:
compares first positional coordinates of a fourth vertex point of the plurality of vertex points with second positional coordinates of a fifth vertex point of the plurality of vertex points, wherein the fourth vertex point is immediately prior to the fifth vertex point; and
discards the fifth vertex point when the first and second positional coordinates are substantially the same.

15. The device of claim 14, wherein the processing unit:
compares third positional coordinates of a sixth vertex point of the plurality of vertex points with the second positional coordinates, wherein the fifth vertex point is immediately prior to the sixth vertex point; and
discards the sixth vertex point when the second and third positional coordinates are substantially the same.

16. The device of claim 15, wherein the processing unit:
outputs the positional coordinates of the fifth vertex point when the first and second positional coordinates are not substantially the same; and
concurrently outputs the positional coordinates of the sixth vertex point when the second and third positional coordinates are not substantially the same.

17. The device of claim 13, wherein the processing unit discards the one of the first, second, and third vertex points that substantially lies on a straight line formed by a previous vertex point and a subsequent vertex point.

18. The device of claim 13, wherein the processing unit discards the second vertex point when the first and second computed slopes are substantially the same.

19. The device of claim 18, wherein the processing unit:
compares the positional coordinates of the first vertex point with the positional coordinates of the second vertex point; and
discards the second vertex point when the positional coordinates of the first vertex point and the positional coordinates of the second vertex point are substantially the same.

20. The device of claim 13, wherein the processing unit:
obtains an index value that indicates a sequential position of the current vertex point in the plurality of vertex points; and
determines the positional coordinates in the display coordinate space for each of the plurality of vertex points as a function of the index value.

21. The device of claim 20, wherein the processing unit includes a counter that generates the index value.

22. The device of claim 13, wherein the processing unit renders the curve to present the curve to a display.

23. The device of claim 13, wherein the vertex points lie on a two-dimensional curve and the processing unit comprises a three-dimensional (3D) graphics processing unit (GPU).

24. The device of claim 13, wherein the processing unit comprises a vertex shader of a three-dimensional (3D) graphics processing unit (GPU), the vertex shader further comprising:
a positional coordinate calculation module that determines the positional coordinates in the display coordinate space for each of the plurality of vertex points that lie on the curve to be rendered; and
a vertex discarding module that computes the first slope between the positional coordinates of the first vertex point and the positional coordinates of the second vertex point, computes the second slope between the positional coordinates of the second vertex point and the positional coordinates of the third vertex point, and discards the one of the first, second, and third vertex points when the first and second computed slopes are substantially the same.

25. The device of claim 13, wherein the device comprises a wireless communication device.

26. The device of claim 13, wherein the device comprises an integrated circuit device.

27. The device of claim 13, wherein the processing unit discards at least one of the plurality of vertex points that maps to the same pixel position as at least one other vertex point of the plurality of vertex points.

28. A computer-readable medium comprising instructions that, when executed, cause at least one processor to:
   determine positional coordinates for each of a plurality of vertex points that lie on a curve to be rendered;
   compute a first slope between positional coordinates of a first vertex point and positional coordinates of a second vertex point;
   compute a second slope between the positional coordinates of the second vertex point and positional coordinates of a third vertex point; and
   discard one of the first, second, and third vertex points when the first and second computed slopes are substantially the same.

29. The device of claim 28, further comprising instructions that cause the processor to discard at least one of the plurality of vertex points that maps to the same pixel position as at least one other vertex point of the plurality of vertex points.

30. The computer-readable medium of claim 28, further comprising:
   instructions that cause the processor to compare first positional coordinates of a fourth vertex point of the plurality of vertex points with second positional coordinates of a fifth vertex point of the plurality of vertex points, wherein the fourth vertex point is immediately prior to the fifth vertex point; and
   instructions that cause the processor to discard the fifth vertex point when the first and second positional coordinates are substantially the same.

31. The computer-readable medium of claim 28, wherein the instructions that cause the processor to discard the one of the first, second, and third vertex points comprise instructions that cause the processor to discard at least one vertex point that substantially lies on a straight line formed by a previous vertex point and a subsequent vertex point.

32. The computer-readable medium of claim 28, wherein the instructions that cause the processor to discard the one of the first, second, and the third vertex points comprise instructions that cause the processor to discard the second vertex point when the first and second computed slopes are substantially the same.

33. The computer-readable medium of claim 32, further comprising:
   instructions that cause the processor to compare the positional coordinates of the first vertex point with the positional coordinates of the second vertex point; and
   instructions that cause the processor to discard the second vertex point when the positional coordinates of the first vertex point and the positional coordinates of the second vertex point are substantially the same.

34. The computer-readable medium of claim 28, further comprising instructions that cause the processor to obtain an index value that indicates a sequential position of the current vertex point in the plurality of vertex points, wherein the instructions that cause the processor to determine the positional coordinates comprise instructions that cause the processor to determine the positional coordinates in the display coordinate space for each of the plurality of vertex points as a function of the index value.

35. The computer-readable medium of claim 34, wherein the instructions that cause the processor to obtain the index value comprises instructions that cause the processor to obtain the index value from a counter of a graphics processing unit (GPU).

36. The computer-readable medium of claim 28, further comprising instructions that cause the processor to render the curve to present the curve to a display.

37. The computer-readable medium of claim 28, wherein:
   the instructions that cause the processor to compute the first slope comprise instructions that cause the processor to compute, with a vertex shader of a three-dimensional (3D) graphics processing unit (GPU), the first slope between the positional coordinates of the first vertex point and the positional coordinates of the second vertex point,
   the instructions that cause the processor to compute the second slope comprise instructions that cause the processor to compute, with the vertex shader of the 3D GPU, the second slope between the positional coordinates of the second vertex point and the positional coordinates of the third vertex point, and
   the instructions that cause the processor to discard the one of the first, second, and third vertex points comprise instructions that cause the processor to discard, with the vertex shader of the 3D GPU, the one of the first, second, and third vertex points when the first and second computed slopes are substantially the same.

38. A device comprising:
   means for determining positional coordinates for each of a plurality of vertex points that lie on a curve to be rendered;
   means for computing a first slope between positional coordinates of a first vertex point and positional coordinates of a second vertex point;
   means for computing a second slope between the positional coordinates of the second vertex point and positional coordinates of a third vertex point; and
   means for discarding one of the first, second, and third vertex points when the first and second computed slopes are substantially the same.

39. The device of claim 38, further comprising:
   means for comparing first positional coordinates of a fourth vertex point of the plurality of vertex points with second positional coordinates of a fifth vertex point of the plurality of vertex points, wherein the fourth vertex point is immediately prior to the fifth vertex point; and
   means for discarding the fifth vertex point when the first and second positional coordinates are substantially the same.

40. The device of claim 39, further comprising:
   means for comparing third positional coordinates of a sixth vertex point of the plurality of vertex points with the second positional coordinates, wherein the fifth vertex point is immediately prior to the sixth vertex point; and
   the discarding means discards the sixth vertex point when the second and third positional coordinates are substantially the same.

41. The device of claim 40, further comprising:
   means for outputting the positional coordinates of the fifth vertex point when the first and second positional coordinates are not substantially the same; and
   wherein the outputting means concurrently outputs the positional coordinates of the sixth vertex point when the second and third positional coordinates are not substantially the same.

42. The device of claim 38, wherein the discarding means discards at least one vertex point that substantially lies on a straight line formed by a previous vertex point and a subsequent vertex point.

43. The device of claim 38, wherein
the discarding means discards the second vertex point when the first and second computed slopes are substantially equal.

44. The device of claim 43, further comprising:
means for comparing the positional coordinates of the first vertex point with the positional coordinates of the second vertex point; and
means for discarding the second vertex point when the positional coordinates of the first vertex point and the positional coordinates of the second vertex point are substantially the same.

45. The device of claim 38, further comprising means for obtaining an index value that indicates a sequential position of the current vertex point in the plurality of vertex points, wherein the determining means determines the positional coordinates in the display coordinate space for each of the plurality of vertex points as a function of the index value.

46. The device of claim 45, further comprising means for generating the index value within a graphics processing unit (GPU).

47. The device of claim 38, further comprising means for rendering the curve to present the curve to a display.

48. The device of claim 38, wherein the curve is a two-dimensional curve and the discarding means comprises a vertex shader of a three-dimensional (3D) graphics processing unit (GPU).

* * * * *